United States Patent [19]

Masuko

[11] Patent Number: 4,827,511
[45] Date of Patent: May 2, 1989

[54] AUTOMATIC GAIN CONTROL CIRCUIT FOR CONTROLLING GAIN OF VIDEO SIGNAL IN TELEVISION RECEIVER

[75] Inventor: Akinori Masuko, Fukaya, Japan

[73] Assignee: Kabushiki Kaisha Toshiba, Kawasaki, Japan

[21] Appl. No.: 48,945

[22] Filed: May 12, 1987

[30] Foreign Application Priority Data

May 12, 1986 [JP] Japan .................. 61-106715

[51] Int. Cl.$^4$ ................ H04N 7/167; H04N 5/52; H03G 3/10
[52] U.S. Cl. .................... 380/15; 330/281; 358/176; 358/179; 455/240; 455/242
[58] Field of Search ............ 380/15; 358/174–176, 358/178, 179; 330/281, 278, 279; 455/240, 242, 244

[56] References Cited

U.S. PATENT DOCUMENTS

| | | | |
|---|---|---|---|
| 3,230,458 | 1/1966 | Stangeland | 455/244 |
| 3,450,834 | 6/1969 | De Marinis et al. | 358/174 |
| 4,148,068 | 4/1979 | Hofmann | 358/174 X |
| 4,209,805 | 6/1980 | Ikeda et al. | 358/175 |
| 4,237,490 | 12/1980 | Harford | 358/174 |
| 4,706,285 | 11/1987 | Rumreich | 380/10 X |

FOREIGN PATENT DOCUMENTS

| | | |
|---|---|---|
| 2834886 | 2/1979 | Fed. Rep. of Germany . |
| 2921777C2 | 12/1979 | Fed. Rep. of Germany . |
| 3010242C2 | 9/1980 | Fed. Rep. of Germany . |
| 60-239188 | 5/1984 | Japan . |

Primary Examiner—Stephen C. Buczinski
Assistant Examiner—Linda J. Wallace
Attorney, Agent, or Firm—Cushman, Darby & Cushman

[57] ABSTRACT

An intermediate-frequency automatic gain control circuit generates an IFAGC voltage for controlling the gain of an IF amplifier, in accordance with the level of the output signal of the IF amplifier. An RFAGC voltage provides a voltage for controlling the gain of an RF amplifier of a tuner, in accordance with the IFAGC voltage level. The output voltage of the RFAGC circuit is supplied to a time-constant circuit made up of a series circuit including first and second resistors and a first capacitor, and a second capacitor connected in parallel with the series circuit. The time-constant circuit is connected to a time-constant control circuit made up of first and second diodes connected in parallel with the second resistor. When the output voltage level of the RFAGC circuit increases or decreases above or below the diode voltage, the first or second diode is conductive, to decrease the time constant of the time constant circuit. An RFAGC voltage for controlling the gain of the RF amplifier of the tuner is derived from the node between the second resistor and the first capacitor.

24 Claims, 4 Drawing Sheets

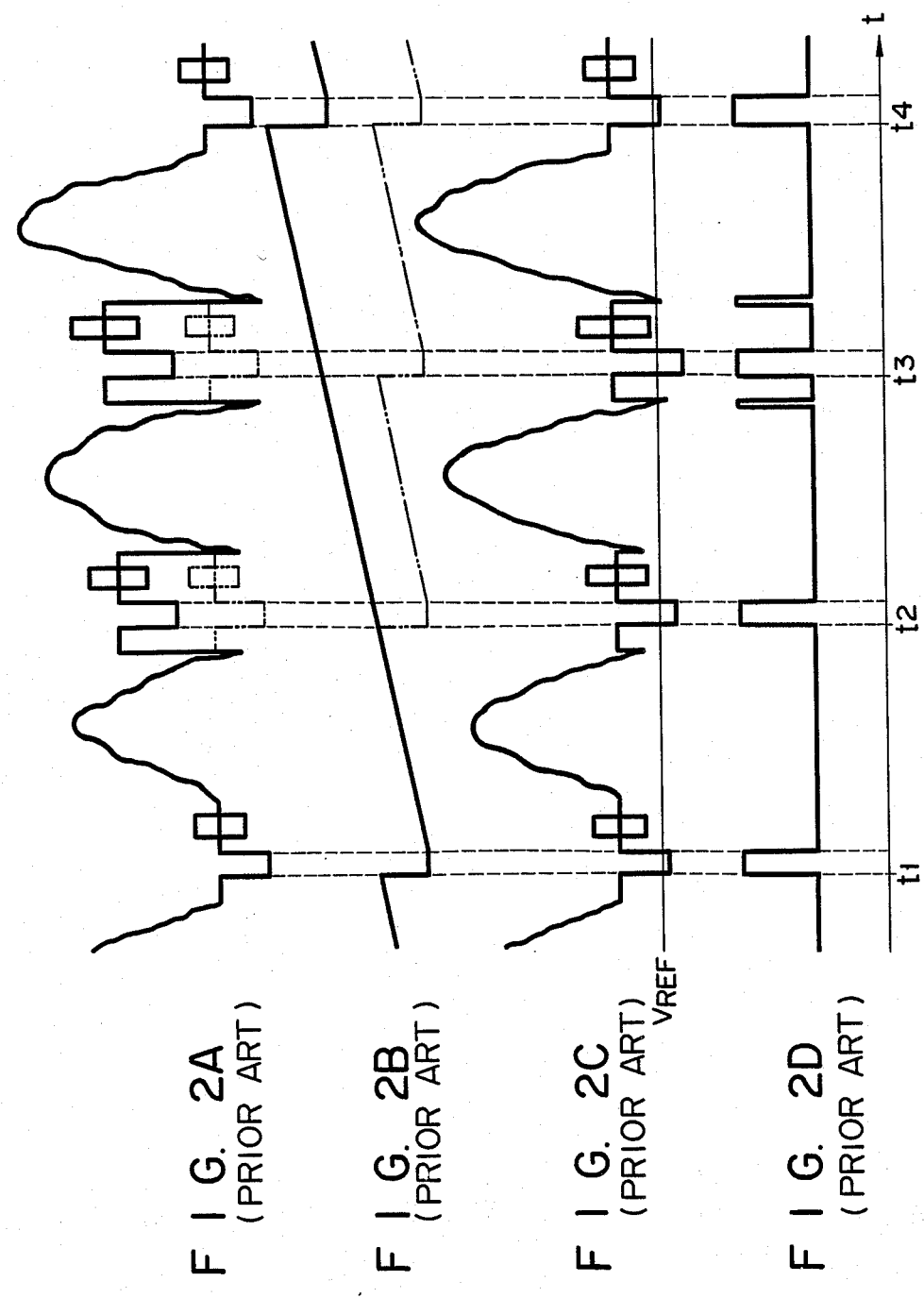

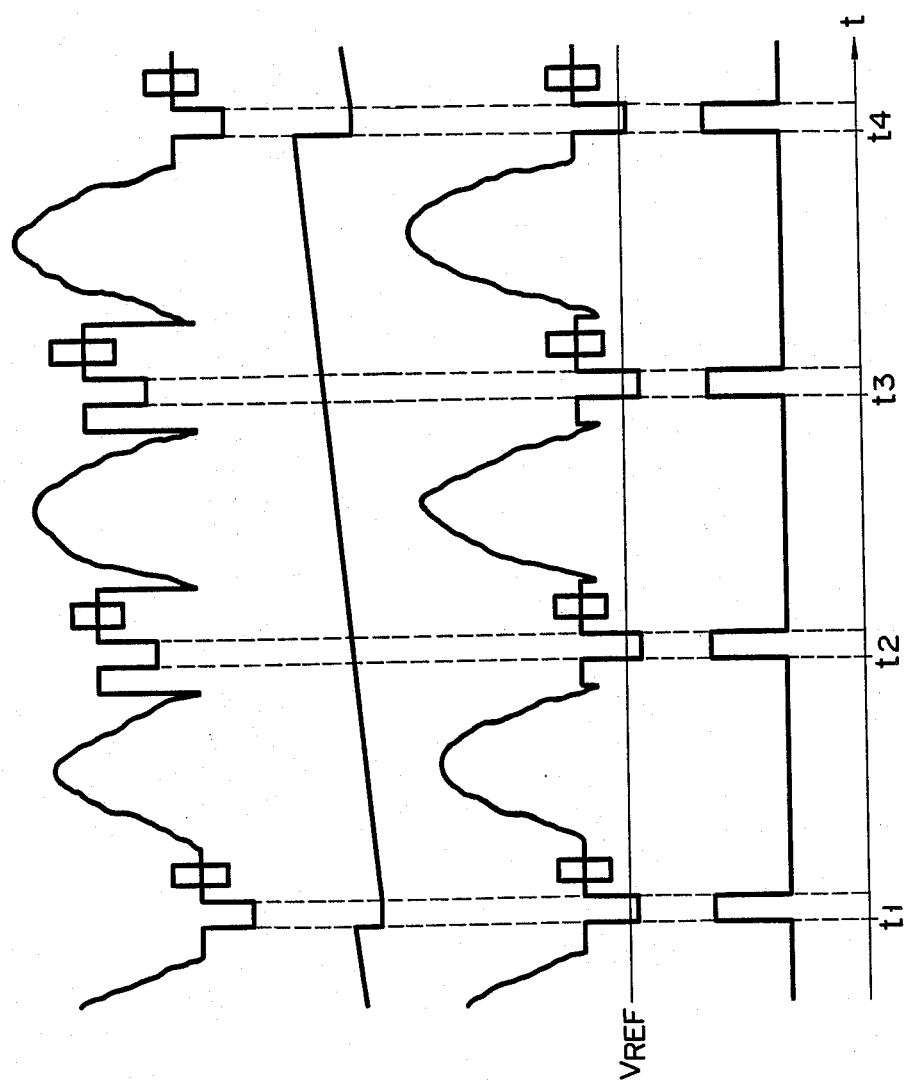

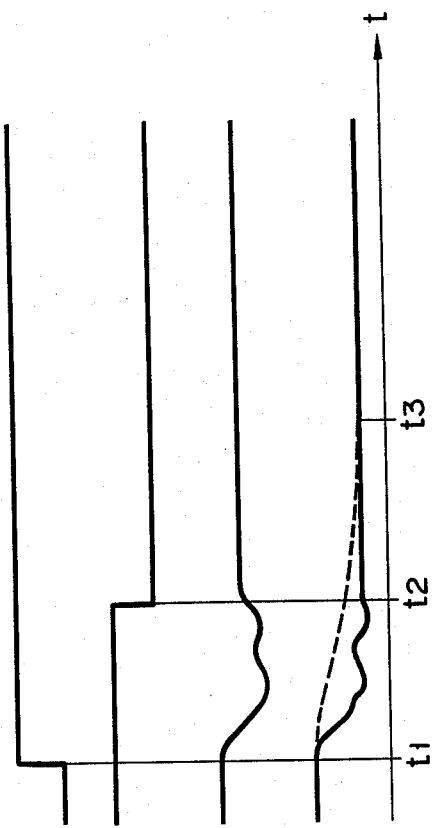
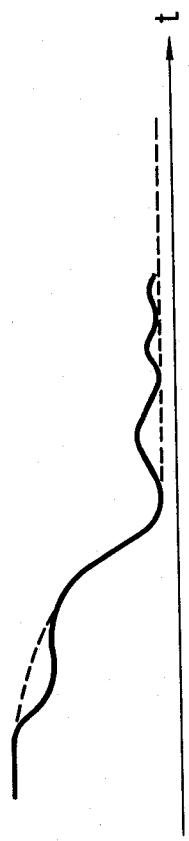

AUTOMATIC GAIN CONTROL CIRCUIT FOR CONTROLLING GAIN OF VIDEO SIGNAL IN TELEVISION RECEIVER

BACKGROUND OF THE INVENTION

The present invention relates to an automatic gain control (AGC) circuit for controlling gain of a video signal in a television receiver, the AGC circuit being applicable to an AGC operation of a video signal in which the offset processing is randomly applied to, for example, the sync signal for scrambling the video signal in pay television.

As is generally known, an AGC circuit maintains gain at a constant level. In a television receiver, for example, the AGC circuit detects the signal level of the video signal obtained by video detection. Based on the detected level, the AGC circuit controls the gain of an intermediate amplifier circuit (IF circuit) and that of a radio frequency circuit (RF circuit) in the tuner. The AGC operation for the IF circuit is called IFAGC, while that for the RF circuit is called RFAGC.

These two types of AGC operation, RFAC and IFAGC, are required in order to obtain a compromise between the noise figure and the cross-modulation distortion. In order to obtain a good noise figure, the greater the gain of the RF circuit, the better. However, a high-gain RF circuit tends to generate a distorted signal due to the nonlinearity involved in an amplifier in the RF circuit. This distorted signal causes cross-modulation interference. Thus, the RF circuit and the IF circuit must be subjected to the AGC control, in order to obtain satisfactory performance with respect to both the noise figure and the cross-modulation interference.

In general, in the amplifier, by a distinguished nonlinearity, the following relation holds between the input signal voltage and the output signal voltage of the amplifier.

$$Y(e) = \sum_{n=1}^{m} K_n e^n \quad (1)$$

where
Y (e) is the output signal voltage of the amplifier
e is the input signal voltage of the amplifier
$K_n$ is the coefficient expressing the linearity of the amplifier
n is the distortion factor In the above relation (1), the nonlinearity distortion contains the distortion components of very high order. However, the distortion components, which must be considered in practical use, are those which are, at most, up to the secondary order (n=2) or the tertiary order (n=3).

When the distortion as given by expression (1) above is produced in a tuner, cross-modulation interference and beat interference occur. The degree of cross-modulation, which represents the degree of cross-modulation interference, is proportional to the square of the signal giving rise to the cross-modulation interference. The cross-modulation interference appears noticeably in a system having a number of transmission channels, such as a CATV.

Beat interference occurs when a number of high-frequency signals are concurrently transmitted, and also occurs if the distorted component generated in the amplifier is present within the frequency band of the high-frequency signal.

When RFAGC is performed on the RF circuit having a plurality of mixers, an RF amplifier is provided at the prestage of the first mixer. The gain of the RF amplifier is controlled in order to reduce distortion. This approach is satisfactory from a viewpoint of reducing the distortion, but is not good from a viewpoint of reducing the C/N (carrier-to-noise) ratio. The C/N ratio is generally given as $$C/N \text{ [dB]} = ei \text{ [dB}\mu\text{]} - NF \text{ [dB]} - 0.86 \text{ dB} \quad (2)$$

where ei is the input signal voltage of the amplifier, and NF is the noise figure. Let the number of cascade-connected amplifiers to be "m", and then the overall C/N ratio (C/N)m is given as $$(C/N)m \text{ [dB]} = (C/N) \text{ [dB]} - 10 \log_{10} m \quad (3)$$

The overall C/N ratio (C/N)m is inversely proportional to the number "m" of cascade-connected amplifiers. This means that when number "m" of amplifiers with the same performance are connected in a cascade fashion, the C/N ratio is degraded by $10 \log_{10} m$ [dB].

Therefore, in order that the C/N ratio, when the amplifiers of "m" stages are cascade-connected, is kept at that for a single stage of amplifier, the input signal level ei at each amplifier is given as $$ei \text{ [dB}\mu\text{]} = e \min \text{ [dB}\mu\text{]} + 10 \log_{10} m \quad (4)$$

where e min is the minimum signal level as calculated using expression (2) above.

As can be seen from the above relation, in order to obtain a predetermined C/N ratio, it is required that the signal be at a predetermined level. Therefore, the gain of an RF amplifier having a function for improving the C/N ratio must be kept at such a value as not to impair the distortion characteristics.

When "m" stages of amplifiers are connected in a cascade fashion, the overall noise figure NFt is given as $$NFt = NF_1 + \frac{NF_2 - 1}{G_1} + \frac{NF_3 - 1}{G_1 G_2} + \frac{NF_m - 1}{G_1 G_2 \ldots G_{m-1}} \quad (5)$$

where $G_1, G_2, \ldots G_m$ are the power gains of respective amplifiers, and $NF_1, NF_2, \ldots NF_m$ are the noise figures of the respective amplifiers.

Expression (5) shows that the greater gain of the RF amplifier provides a satisfactorily low noise figure.

For the above reasons, the AGC operation is performed on the RF circuit and the IF circuit. The RF circuit is controlled so as to suppress the distortion, and the IF circuit is controlled so that the signal gain is kept constant.

In recent years, pay-television, such as CATV has been developed. Various types of protection systems have been incorporated in such pay-television system in order to prevent people other than the subscribers from watching the television. In one of the protection systems, a scrambled signal, for example, is used as a broadcast signal. By using a descramble circuit, provided in the subscriber's terminal, the scrambled signal is descrambled, and a normal video signal is obtained.

Various systems are used for scrambling the video signal. These include RF scramble and base band scramble. The base band scramble can be classified into the video insertion system, the sync offset system, and the sync suppress system.

Pay-television such as CATV receives a multi-channel broadcast signal. In this case, due to the nonlinearity distortion of the active elements in the RF amplifier and in the mixer for frequency-converting in the tuner, an unwanted distorted signal, as expressed by expression (1) above, is generated. The distorted signal, or cross-modulation distortion, affects the video signal. In order to prevent the effect by this distortion, the gain of the tuner is controlled.

The input field strength (AGC delay point) at which the RFAGC operation is initiated in consideration of cross modulation distortion level and the noise figure is determined. In other words, the field strength at which RFAGC operation is initiated, together with IFAGC operation, is determined. Thus, the gain of the input signal is suitably controlled.

As a result, optimal gain control of the input signal is performed by the IFAGC and RFAGC operations. However, the AGC operations have to follow up the change of the input level.

This requirement causes problems, especially when the AGC operation is performed in relation to a video scrambled signal whose horizontal sync signal is made offset. That is to say, full consideration has to be taken for the response characteristics of the IFAGC and RFAGC.

SUMMARY OF THE INVENTION

Accordingly, an object of this invention is to provide an AGC circuit in which the response characteristic of the RFAGC can be controlled without impairing the response characteristic of the IFAGC, and in which, therefore, a stable AGC can be performed on the arrival wave signal such as the scrambled signal lacking the sync signal.

To realize the above object, an automatic gain control (AGC) circuit is provided for controlling the gain of a video signal in a television receiver, which comprises: a tuner which has an input terminal for receiving a video signal at a radio frequency (RF), an RF amplifier for amplifying the RF video signal which is received at the input terminal, a frequency-converter for frequency-converting the RF video signal, amplified by the RF amplifier, into an intermediate-frequency (IF) video signal, and an output terminal for outputting the IF video signal coming from the frequency-converter; an IF amplifier for receiving the IF video signal output from the output terminal of the tuner, and for amplifying the received IF video signal; a detecting circuit for receiving the output signal of the IF amplifier, and for video-detecting the received output signal; an IFAGC circuit for receiving the detected output signal of the detecting circuit, and for generating a voltage signal for controlling the gain of the IF amplifier, in accordance with the level of the detected signal received; a first time-constant circuit, for receiving the voltage signal generated by the IFAGC circuit, for applying a first time-constant to the received voltage signal, and for supplying the received voltage signal with the first time-constant, as an IFAGC voltage signal, to the IF amplifier; an RFAGC circuit for receiving the IFAGC voltage signal, and for generating a voltage signal for controlling the gain of the RF amplifier of the tuner, in accordance with the level of the received IFAGC voltage signal; a second time-constant circuit, for receiving the output voltage signal of the RFAGC circuit, for applying either a second or third time-constant to the received output voltage signal, and for supplying the received output voltage signal with the second or third time-constant, as an RFAGC voltage signal, to the RF amplifier of the tuner, the second and third time-constants being longer than the first time-constant; and a time-constant controller for receiving the output voltage signal of the RFAGC circuit, and for controlling the time-constant of the second time-constant circuit, in accordance with the change in level of the received output voltage signal.

BRIEF DESCRIPTION OF THE DRAWINGS

FIGS. 2A to 2D show waveform charts for explaining a prior AGC operation, in which FIG. 2A shows the waveforms of the video detection output, FIG. 2B IFAGC voltage waveform, FIG. 2C reproduced video waveform, and FIG. 2D horizontal sync output waveform;

FIGS. 3A to 3D show waveform charts, respectively corresponding to FIGS. 2A to 2D, for explaining the operation of the AGC circuit of FIG. 1;

FIGS. 4A to 4D show waveforms of the signal during a tuning transition for channel selection at circuit points in the FIG. 1 AGC circuit; and FIG. 5 shows a waveform of the RFAGC voltage during the tuning transition in the AGC circuit of FIG. 1.

DETAILED DESCRIPTION OF THE PREFERRED EMBODIMENT

Figure 1:
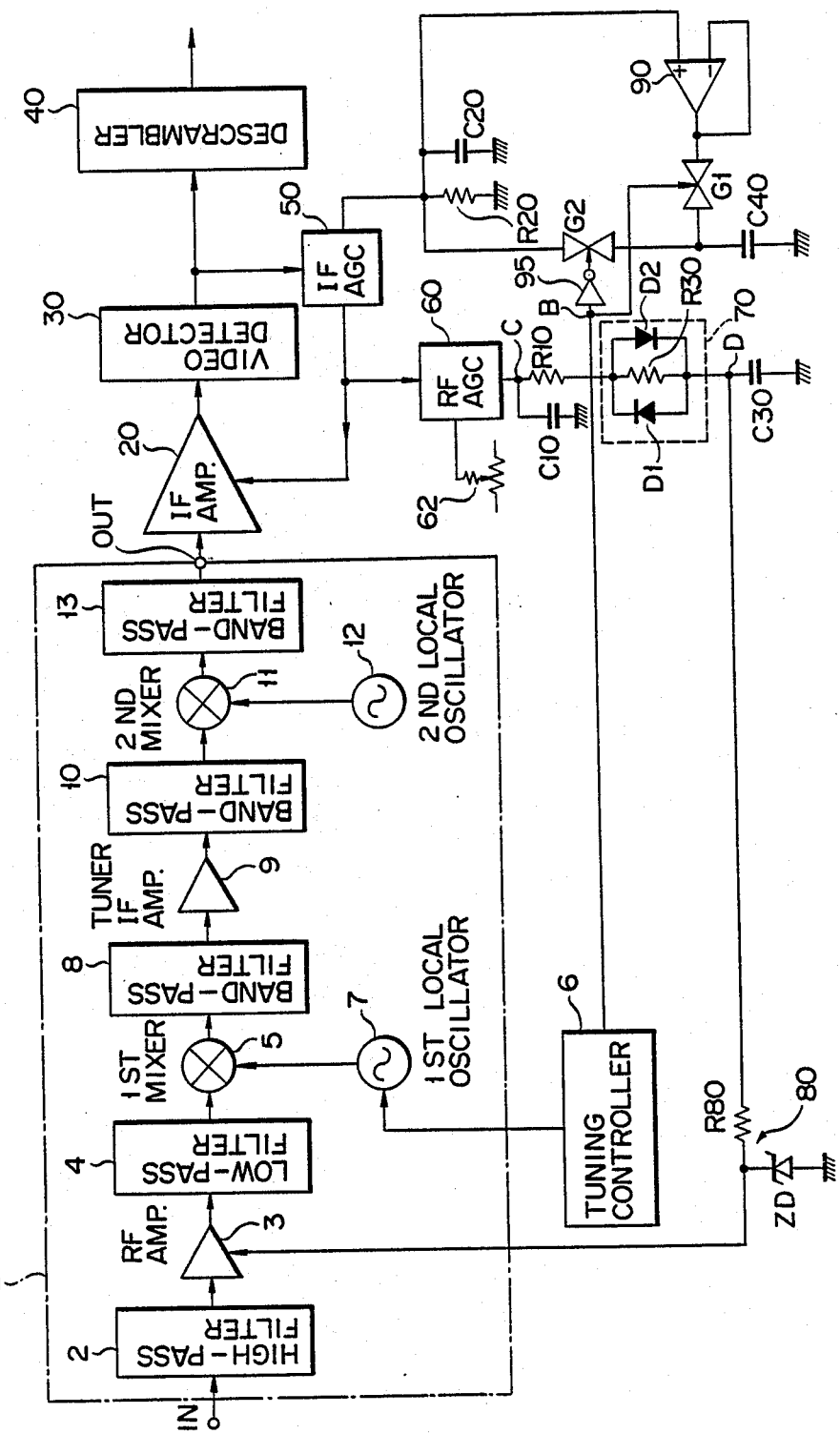
FIG. 1 is a circuit diagram of an embodiment of an AGC circuit according to this invention.

An embodiment according to the present invention will now be described, with reference to the accompanying drawings.

FIG. 1 shows an AGC circuit of this invention, which is used in connection with a video signal circuit for processing a scrambled video signal in paytelevision such as CATV. Various signal-scramble systems are used. In the description to follow, a sync offset system, for randomly offsetting the sync signal, is taken as an example.

In the figure, a scrambled multi-channel CATV signal is input to (up and down) tuner 1. In tuner 1, the input signal is supplied to RF amplifier 3 via high-pass filter 2. RF amplifier 3 is a gain-variable amplifier. The gain of the amplifier is adjusted mainly for setting the nonlinearity distortion, given by the expression (1), to an appropriate value. The output of RF amplifier 3 is supplied to first mixer 5 via low-pass filter 4. First local oscillator 7 outputs an oscillating frequency corresponding to the broadcast station specified by tuning controller 6. By using the output of first local oscillator 7, first mixer 5 high-frequency converts the television signal from RF amplifier 3. The high-frequency converted output of first mixer 5 is amplified by tuner IF amplifier 9 after its unwanted signal is removed by band-pass filter 8. Then, it is supplied to second mixer 11 via band-pass filter 10. By using the output of second local oscillator 12, second mixer 11 low-frequency converts the high-frequency converted television signal. The low-frequency converted signal is output to output terminal OUT of tuner 1 via band-pass filter 13.

The output of tuner 1 is input to IF amplifier 20. Through the IFAGC operation, the gain of IF amplifier 20 is controlled so that the noise figure given by the expression (5) is not impaired, and its output is kept at a predetermined constant level. The output of IF amplifier 20 is supplied to video detector 30, where video detection is performed. The detected video signal is supplied to descrambler 40, where the descrambling processing is executed to reproduce the video signal.

The output of video detector 30 is also supplied to IFAGC circuit 50. IFAGC circuit 50 generates an IFAGC DC voltage which corresponds to the level of the video-detected output. The gain of IF amplifier 20 is controlled by the generated IFAGC voltage. The time-constant for the IFAGC is set by resistor R20 and capacitor C20.

The output of IFAGC circuit 50 is also supplied to RFAGC circuit 60. RFAGC circuit 60 executes the called AGC delay to make the RFAGC follow the IFAGC operation, and generates an RFAGC voltage for controlling the gain of RF amplifier 3 of tuner 1. The volume of the AGC delay is set by variable resistor 62.

The output of RFAGC circuit 60 is supplied to a parallel circuit made up of capacitor C10, and a series circuit including resistor R10, time-constant controller 70 and capacitor C30. Controller 70 is made up of two diodes, D1 and D2, and resistor R30, which are connected in parallel. Capacitor C10 is for removing the video component.

The RFAGC voltage is derived from the connection point D of time-constant controller 70 and capacitor C30. The RFAGC voltage is supplied to the RF amplifier 3 of tuner 1, via clamp circuit 80. Clamp circuit 80 is for clamping the RFAGC voltage to below a AGC control level of RFAGC amplifier 3. Clamp circuit 80 comprises resistor R80 and zener diode ZD.

Time-constant controller 70 has a configuration such that, in accordance with the change in value of the output voltage of RFAGC circuit 60, it selects the RFAGC time-constant. As is described above, time-constant controller 70 comprises diodes D1 and D2, and resistor R30 which are connected in parallel. When the output voltage change of RFAGC circuit 60 exceeds diode voltage, either of the diodes is made conductive. When diode D1 or D2 is conductive, a time-constant of the time-constant circuit, which is connected to the output of RFAGC circuit 60, is approximately $(C10+C30) \times R10$.

On the other hand, when the output voltage change of RFAGC circuit 60 is less than the forward voltage of the diode, diodes D1 and D2 are in an off state. In this case, the time-constant is approximately $(C10+C30) \times (R10+R30)$. Since resistor R30 is a high-resistance type, this time-constant is longer than that when diode D1 or D2 is conductive.

Note here that diodes D1 and D2 are not made coductive simultaneously. If an increase occurs in the output voltage of RFAGC circuit 60, which exceeds the diode voltage, diode D2 is conductive. Conversely, if a decrease occurs in the output voltage, which exceeds the diode voltage, diode D1 is conductive. In this way, time-constant controller 70 controls the time-constant in the RFAGC, in accordance with the change in value of the output voltage of RFAGC circuit 60.

As recalled, in the AGC operation, the gains of IF amplifier 20 and of RF amplifier 3 of tuner 1 are controlled, allowing for the signal noise figure and the cross-modulation distortion. In this case, the responsetime characteristic must also be taken into consideration. Generally, the response time of the RFAGC must be shorter than that of the IFAGC. One reason for this is that the IFAGC is performed on the signal which is obtained after the video detection, and is a demodulated video signal itself. Another reason is that the RFAGC executes the AGC operation with retardation with respect to the IFAGC operation, and prevents characteristics degradation, such as the cross-modulation distortion.

The AGC detection in the AGC operation is classified into a peak AGC detection, an average AGC detection, and a keyed AGC detection. In this embodiment, the peak detection is employed, for example.

Assuming that the video signal input to the FIG. 1 circuit is a scrambled video signal in which the sync signal is randomly made offset, as is shown in FIG. 2A. The IFAGC voltage decreases because the sync signal at a low level is detected at time t1. At time t2 when a signal whose sync signal is made offset, the IFAGC voltage increases, as is shown in FIG. 2B. Thus, even if there is no extreme variation in the level of the image signal of the video signal, the gain of the IF amplifier 20 is unintentionally increased because the sync signal is made offset. This results in the generation of flickers in the reproduced image. In an extreme case, the image signal of the reproduced video signal is amplified to below the normal pedestal level, or even below the reference level $V_{REF}$ for the sync separation, as is shown in FIG. 2C. In this case, the normal sync separation becomes difficult, as is shown in FIG. 2D, and the descrambling operation becomes impossible to perform.

To avoid this, the capacitance of capacitor C20 constituting the time-constant circuit of the IFAGC, is increased, to reform the waveform of the IFAGC voltage, as is shown by a one-dot-chain line in FIG. 2B. This is done irrespective of the arrival of the sync offset voltage signal. In other words, by increasing the capacitance of capacitor C20 which is connected to the output terminal of IFAGC circuit 50, the IFAGC is effective for the video signal lacking the horizontal sync signal.

However, when the IFAGC time-constant is long, the time-constant for the RFAGC must also be set long, because the RFAGC must operated with some delay from the IFAGC operation. Therefore, the RFAGC time-constant must also be increased. The mere increase of the RFAGC time constant results in the degradation of the response characteristics of the RFAGC. To avoid this, in this invention, if sudden change occurs in the output voltage of RFAGC circuit 60, which exceeds the diode voltage, either diode D1 or D2 is made conductive, in order to compensate for the degradation of the response characteristics of the RFAGC.

As is described above, with the increase the IFAGC time-constant, the AGC delay is performed while the RFAGC time-constant is controlled by time-constant controller 70. As a result, a stable AGC operation is ensured. Therefore, even if no horizontal sync signal is contained in successive several lines, as is shown in FIG. 3A, a stable IFAGC voltage can be obtained as shown in FIG. 3B, as compared with the IFAGC voltage shown in FIG. 2B. Consequently, the reproduced video signal is not amplified until it goes below the reference level VREF, either, as is shown in FIG. 3C, and the normal sync separation is possible, as is shown in FIG. 3D.

Stabilization of the AGC system is required not only when the above scrambled video signal arrives, but also during the tuning transition. A circuit for stabilizing the system during the tuning transition is connected to IFAGC circuit 50. As is shown, a parallel circuit of resistor R20 and capacitor C20 for setting the time-constant of IFAGC circuit 50, is connected in parallel with capacitor C40. Capacitor C40 is connected so as to be charged and discharged via buffer amplifier 90 and gate G1, and discharged via gate G2. Gates G1 and G2 are gated by a select signal supplied from tuning controller 6. Gate G2 is supplied with the select signal via inverter 95, so that when gate G1 is on, gate G2 will be off.

Therefore, during the tuning transition, gate G1 is conductive, and the output of IFAGC voltage circuit 50 is connected to capacitor 40. First, capacitor C40 is charged by the IFAGC voltage. The operation during the tuning transition will now be described, with reference to the timing charts of FIGS. 4A to 4D. As is shown in FIG. 4A, from time t1 of tuning till time t2 when the select signal at point B of FIG. 1 changes its state (FIG. 4B), capacitor C40 is actively charged to a predetermined value. At time t2, gate G1 is turned off. This quickens the stabilization of the IFAGC voltage during tuning transition. In response to this, a sudden change in the voltage at point C, i.e., the output voltage of RFAGC circuit 60, is prevented. From time t2 on, gate G2 is conductive, to quicken the stabilization of the IFAGC voltage. Therefore, as is shown by a solid line in FIG. 4D, the voltage at point D, i.e., the RFAGC voltage, settles down more quickly than in the prior art, in which it does not settle down till time t3, as is shown by a dotted line in FIG. 4D.

FIG. 5 shows a variation of the RFAGC voltage during the tuning transition. In the figure, the solid line represents the transition characteristics when capacitor C40 is not charged during the tuning transition and when time-constant controller 70 is not operated. A broken line describes how the RFAGC voltage is stabilized or settles down during the tuning transient. This stabilization results from the cooperation of the transient charge to capacitor C40 with the operation of time-constant controller 70.

As can be seen from the graph, even if the IFAGC time-constant is increased to a certain degree so as to cope with the the scrambled signal, which is formed by subjecting the input video signal to the offset processing, and with the case that the electric field strength is suddenly changed due to fluttering, for example, the RFAGC voltage can be stabilized, and therefore, the stabilization of the AGC system is realized, thus stabilizing the AGC control system. Thus, irrespective of the state of the arrival signal, both the RFAGC and IFAGC can be optimumly controlled, satisfying the requirements for the signal distortion and noise figure performance.

As has been described above, in the AGC circuit according to this invention, with provision of timeconstant controller 70 in the RFAGC circuit, the response characteristics of the RFAGC can be controlled without impairing the response characteristics of the IFAGC operation. Therefore, even if the input signal is a scrambled signal lacking the horizontal sync signal, a stable AGC operation can be secured. It should be noted here that the RFAGC voltage controls the AGC time-constant only when the change in level of the RFAGC voltage exceeds a predetermined level. This feature enables the RFAGC to appropriately control the time-constant so that the AGC system will be stabilized, while keeping its follow-up characteristic for a variation in the level of the arrival signal.

The AGC circuit according to this invention is applicable for control of the RFAGC time-constant, not only when the peak AGC detection is used, but also when other types of AGC detection, such as the keyed AGC detection, are used.

Even when any type of AGC detecting means is used, the response characteristic and the gain control of the RFAGC can be optimumly controlled, thus not impairing the noise figure and the signal distortion characteristic.

While the present invention has been described, by way of example, in connection with a CATV using a scrambled video signal, it should be understood that this invention is applicable for the normal TV set for receiving the normal broadcasting TV programs.

As recalled, in the above-mentioned embodiment, the output signal of video detector 30 is received. Such a modification of the embodiment, whereby the video signal descrambled by descramble circuit 40 is received, is within the scope of this invention.

What is claimed is:

1. An automatic gain control (AGC) circuit for controlling a gain of a video signal in a television receiver, comprising:

tuner means having input terminal means for receiving a video signal at a radio frequency (RF), RF amplifier means for amplifying the RF video signal which is received at said input terminal means, frequency-converting means for frequency-converting the RF video signal amplified by said RF amplifier means, into an intermediate-frequency (IF) video signal, and output terminal means for outputting the IF video signal coming from said frequency-converting means;

IF amplifier means for receiving said IF video signal output from the output terminal means of said tuner means, and for amplifying the received IF video signal;

detecting circuit means for receiving the output signal of said IF amplifier means, and for videodetecting the received output signal;

IFAGC circuit means for receiving the detected output signal of said detecting circuit means, and for generating a voltage signal for controlling the gain of said IF amplifier means, in accordance with the level of the detected signal received;

first time-constant circuit means, for receiving the voltage signal generated by said IFAGC circuit means, for applying a first time-constant to the received voltage signal, and for supplying the received voltage signal with said first time-constant, as an IFAGC voltage signal, to said IF amplifier means;

RFAGC circuit means for receiving said IFAGC voltage signal, and for generating a voltage signal for controlling the gain of said RF amplifier means of said tuner means, in accordance with the level of said received IFAGC voltage signal;

second time-constant circuit means, for receiving the output voltage signal of said RFAGC circuit means, for applying either a second or third time-constant to the received output voltage signal, and for supplying the received output voltage signal with the second or third time-constant, as an RFAGC voltage signal, to said RF amplifier means of said tuner means, said second and third time-constants being longer than said first time-constant; and time-constant control means for receiving the output voltage signal of said RFAGC circuit means, and for controlling the time-constant of said second time-constant circuit means, in accordance with the change in level of the received output voltage signal.

2. The AGC circuit according to claim 1, wherein said time-constant control means includes means for controlling the time-constant of said second time-constant circuit means, so that when the change in level of the output voltage of said RFAGC circuit means is greater than a predetermined value, said third time-constant is selected, and said third time-constant is shorter than said second time-constant.

3. The AGC circuit according to claim 2, wherein said control means includes means for operating to decrease a resistance of said second time-constant circuit means when the change in level of the output voltage of said RFAGC circuit is greater than a predetermined value.

4. The AGC circuit according to claim 3, wherein said second time-constant circuit means comprises a series circuit including first and second resistors and a first capacitor, which are connected in series to the output terminal of said RFAGC circuit means, and a second capacitor, connected in parallel to the series circuit, and said RFAGC voltage signal is derived from the node between said second resistor and said first capacitor; and said operating means includes by-pass means for causing the signal to by-pass the second resistor of said second time-constant circuit means when the change in level of the output voltage of said RFAGC circuit means is greater than a predetermined value.

5. The AGC circuit according to claim 4, wherein said by-pass control means includes nonlinear element means which is connected in parallel to the second resistor of said second time-constant circuit means.

6. The AGC circuit according to claim 5, wherein said nonlinear element means includes: a first nonlinear element connected in parallel to the second resistor of said second time-constant circuit means, which is conductive when an increase in the output voltage signal of said RFAGC circuit means exceeds a predetermined value; and a second nonlinear element connected in parallel to the second resistor of said second time-constant circuit means, which is conductive when a decrease in the output voltage signal of said RFAGC circuit means exceeds a predetermined value.

7. The AGC circuit according to claim 6, wherein said first nonlinear element is a diode, the anode of said diode being connected to the node between the first resistor and the second resistor of said second time-constant circuit means, and the cathode of said diode being connected to the node between the second resistor and the first capacitor of said second time-constant circuit means; and said second nonlinear element is a diode, the anode of said diode being connected to the node between the second resistor and the first capacitor of said second time-constant circuit means, and the cathode of said diode being connected to the node between the first resistor and the second resistor of said second time-constant circuit means.

8. The AGC circuit according to claim 7, further comprising means for causing said first time-constant to be temporarily longer than said second and third time-constants during a turning transition.

9. An automatic gain control (AGC) circuit for controlling a gain of a scrambled video signal in which the sync signal is randomly offset from a video signal for a cable television receiver comprising:

tuner means having input terminal means for receiving a scrambled video signal at a radio frequency (RF), RF amplifier means for amplifying the RF scrambled video signal which is received at said input terminal means, frequency-converting means for frequency-converting the RF scrambled video signal amplified by said RF amplifier means, into an intermediate-frequency (IF) scrambled video signal, and output terminal means for outputting the IF scrambled video signal coming from said frequency-converting means;

IF amplifier means for receiving said IF video scrambled signal output from the output terminal means of said tuner means, and for amplifying the received IF scrambled video signal;

detecting circuit means for receiving the output signal of said IF amplifier means, and for video-detecting the received output signal;

IFAGC circuit means for receiving the detected output signal of said detecting circuit means, and for generating a voltage signal for controlling the gain of said IF amplifier means, in accordance with the level of the detected signal received;

first time-constant circuit means, for receiving the voltage signal generated by said IFAGC circuit means, for applying a first time-constant to the received voltage signal, and for supplying the received voltage signal with said first time-constant, as an IFAGC voltage signal, to said IF amplifier means;

RFAGC circuit means for receiving said IFAGC voltage signal, and for generating a voltage signal for controlling the gain of said RF amplifier means of said tuner means, in accordance with the level of said received IFAGC voltage signal;

second time-constant circuit means, for receiving the output voltage signal of said RFAGC circuit means, for applying either a second or third time-constant to the received output voltage signal, and for supplying the received output voltage signal with the second or third time-constant, as an RFAGC voltage signal, to said RF amplifier means of said tuner means, said second and third time-constants being longer than said first time-constant; and time-constant control means for receiving the output voltage signal of said RFAGC circuit means, and for controlling the time-constant of said second time-constant circuit means, in accordance with the change in level of the received output voltage signal.

10. The AGC circuit according to claim 9, wherein said time-constant control means includes means for controlling the time-constant of said second time-constant circuit means, so that when the change in level of the output voltage of said RFAGC circuit means is greater than a predetermined value, said third time-constant is selected, and said third time-constant is shorter than said second time-constant.

11. The AGC circuit according to claim 10, wherein said control means includes means for operating to decrease a resistance of said second time-constant circuit means when the change in level of the output voltage of said RFAGC circuit is greater than a predetermined value.

12. The AGC circuit according to claim 11, wherein said second time-constant circuit means comprises a series circuit including first and second resistors and a first capacitor, which are connected in series to the output terminal of said RFAGC circuit means, and a second capacitor, connected in parallel to the series circuit, and said RFAGC voltage signal is derived from the node between said second resistor and said first capacitor; and said operating means includes by-pass includes means for causing the signal to by-pass the second resistor of said second time-constant circuit means when the change in level of the output voltage of said RFAGC circuit means is greater than a predetermined value.

13. The AGC circuit according to claim 12, wherein said by-pass means includes nonlinear element means which is connected in parallel to the second resistor of said second time-constant circuit means.

14. The AGC circuit according to claim 13, wherein said nonlinear element means includes: a first nonlinear element connected in parallel to the second resistor of said second time-constant circuit means, which is conductive when an increase in the output voltage signal of said RFAGC circuit means exceeds a predetermined value; and a second nonlinear element connected in parallel to the second resistor of said second time-constant circuit means, which is conductive when a decrease in the output voltage signal of said RFAGC circuit means exceeds a predetermined value.

15. The AGC circuit according to claim 14, wherein said first nonlinear element is a diode, the anode of said diode being connected to the node between the first resistor and the second resistor of said second time-constant circuit means, and the cathode of said diode being connected to the node between the second resistor and the first capacitor of said second time-constant circuit means, and said second nonlinear element is a diode, the anode of said diode being connected to the node between the second resistor and the first capacitor of said second time-constant circuit means, and the cathode of said diode being connected to the node between the first resistor and the second resistor of said second time-constant circuit means.

16. The AGC circuit according to claim 15, further comprising means for causing said first time-constant to be temporarily longer than said second and third time-constants during a turning transition.

17. An automatic gain control (AGC) circuit for controlling a gain of a scrambled video signal in which the sync signal is randomly offset from a video signal for a cable television receiver comprising:

tuner means having input terminal means for receiving a scrambled video signal at a radio frequency (RF), RF amplifier means for amplifying the RF scrambled video signal which is received at said input terminal means, frequency-converting means for frequency-converting the RF scrambled video signal amplified by said RF amplifier means, into an intermediate-frequency (IF) scrambled video signal, and output terminal means for outputting the IF scrambled video signal coming from said frequency-converting means;

IF amplifier means for receiving said IF video scrambled signal output from the output terminal means of said tuner means, and for amplifying the received IF scrambled video signal;

detecting circuit means for receiving the output signal of said IF amplifier means, and for video-detecting the received output signal;

descramble circuit means for receiving the detected output signal from said detecting circuit means, and for descrambling said scrambled video signal;

IFAGC circuit means for receiving the output signal of said descramble circuit means, and for generating a voltage signal for controlling the gain of said IF amplifier means, in accordance with the level of said output signal of said descramble circuit means;

first time-constant circuit means for receiving the voltage signal generated by said IFAGC circuit means, for applying a first time-constant to the received voltage signal, and for supplying the received voltage signal with said first time-constant, as an IFAGC voltage signal, to said IF amplifier means;

RFAGC circuit means for receiving said IFAGC voltage signal, and for generating a voltage signal for controlling the gain of said RF amplifier means of said tuner means, in accordance with the level of said received IFAGC voltage signal;

second time-constant circuit means for receiving the output voltage signal of said RFAGC circuit means, for applying either a second or third time-constant to the received output voltage signal, and for supplying the received output voltage signal with the second or third time-constant, as an RFAGC voltage signal, to said RF amplifier means of said tuner means, said second and third time-constants being longer than said first time-constant; and time-constant control means for receiving the output voltage signal of said RFAGC circuit means, and for controlling the time-constant of said second time-constant circuit means, in accordance with the change in level of the received output voltage signal.

18. The AGC circuit according to claim 17, wherein said time-constant control means includes means for controlling the time-constant of said second time-constant circuit means so that when the change in level of the output voltage of said RFAGC circuit means is greater than a predetermined value, said third time-constant is selected, and said third time-constant is shorter than said second time constant.

19. The AGC circuit according to claim 18, wherein said control means includes means for operating to decrease a resistance of said second time-constant circuit means when the change in level of the output voltage of said RFAGC circuit is greater than a predetermined value.

20. The AGC circuit according to claim 19, wherein said second time-constant circuit means comprises a series circuit including first and second resistors and a first capacitor, which are connected in series to the output terminal of said RFAGC circuit means, and a second capacitor connected in parallel to the series circuit, and said RFAGC voltage signal is derived from the node between said second resistor and said first capacitor; and said operating means includes by-pass means for causing the signal to by-pass the second resistor of said second time-constant circuit means when the change in level of the output voltage of said RFAGC circuit means is greater than a predetermined value.

21. The AGC circuit according to claim 20, wherein said by-pass means includes nonlinear element means which is connected in parallel to the second resistor of said second time-constant circuit means.

22. The AGC circuit according to claim 21, wherein said nonlinear element means includes: a first nonlinear element connected in parallel to the second resistor of said second time-constant circuit means, which is conductive when an increase in the output voltage signal of said RFAGC circuit means exceeds a predetermined value; and a second nonlinear element connected in parallel to the second resistor of said second time-constant circuit means, which is conductive when a decrease in the output voltage signal of said RFAGC circuit means exceeds a predetermined value.

23. The AGC circuit according to claim 22, wherein said first nonlinear element is a diode, the anode of said diode being connected to the node between the first resistor and the second resistor of said second time-constant circuit means, and the cathode of said diode being connected to the node between the second resistor and the first capacitor of said second time-constant circuit means, and said second nonlinear element is a diode, the anode of said diode being connected to the node between the second resistor and the first capacitor of said second time-constant circuit means, and the cathode of said diode being connected to the node between the first resistor and the second resistor of said second time-constant circuit means.

24. The AGC circuit according to claim 15, further comprising means for causing said first time-constant to be temporarily longer than said second and third time-constants during a turning transition.

* * * * *